P. F. DUNDON.
CRADLE FOR LOG RAFTS.
APPLICATION FILED SEPT. 28, 1912.

1,130,584.

Patented Mar. 2, 1915.

INVENTOR
P. F. Dundon

WITNESSES

UNITED STATES PATENT OFFICE.

PATRICK F. DUNDON, OF SAN FRANCISCO, CALIFORNIA.

CRADLE FOR LOG-RAFTS.

1,130,584. Specification of Letters Patent. Patented Mar. 2, 1915.

Application filed September 28, 1912. Serial No. 722,931.

*To all whom it may concern:*

Be it known that I, PATRICK F. DUNDON, a citizen of the United States, residing at San Francisco, in the county of San Francisco and State of California, have invented new and useful Improvements in Cradles for Log-Rafts, of which the following is a specification.

The object of the present invention is to provide an improved cradle for transporting logs, lumber, or other floatable material, which will better than heretofore withstand the disruptive action of the waves of the ocean.

In the accompanying drawing, Figure 1 is a plan view of my improved log raft; Fig. 2 is an end view on an enlarged scale, part being broken away; Fig. 3 is a vertical section of a bulk head.

Referring to the drawing, 1 indicates a bulkhead comprising vertical members 2, spaced apart at suitable intervals, and horizontal members 3, spaced apart at much shorter intervals, and secured to said vertical members. Two of these bulkheads, respectively at the front and rear of the cradle, are connected together by longitudinal cables 4, the ends of which are secured to swivel eyes 6, in which are held bolts 7, a plurality of which pass through each vertical member 2 and between horizontal members 3 and then through nuts 8 bearing against plates 9, which bear against the outer sides of said vertical members. The logs, shown at 11, extend longitudinally between said bulkheads, which are sufficiently far apart to contain between them from five to ten logs in longitudinal series, the number of logs in series varying greatly because of the great differences in length of the several logs which form the raft.

Each side of the cradle is formed of a longitudinal series of about eight pairs of logs 12, and of beams 13 secured upon said logs 12, the adjacent ends of the beams 13 and of the logs 12 being connected in such series by short cables 14.

Encompassing the logs at suitable intervals are cables 16, herein shown as chains, which pass, on each side of the cradle, between the beams 13 and also between the logs 12 on that side. One end of each chain is attached to a sheave 17 and the other end passes around said sheave. The chain is then drawn tight by any suitable means, and its latter end is then hooked to an adjacent portion of the chain by a hook 18. Adjacent to the chains are posts 19, extending upwardly between a pair of the longitudinally extending logs 12 and the corresponding beams 13, and the logs 12 being mortised as shown at 20 to receive said posts. Each post 19 is connected to a corresponding post directly opposite on the other side of the cradle by three cables 21, 22, 25 passing through the raft of logs, the cable 21 being attached to collars 23 around the lower ends of the posts, and the cables 22, 25 to collars 24, 26 respectively around the posts at a short distance above the beams 13 and near the upper ends of the posts. By providing bulk-heads at the end of the cradle, and tying said bulk-heads together by longitudinal chains, the logs are effectually prevented from escaping endwise from the cradle, and the employment of chains encompassing the logs at suitable intervals prevents the lateral escape of the logs from the cradle, especially when these chains are drawn very tightly around the logs.

In the claims I use the word "cables" as a generic term including hempen or wire ropes, chains, or the like.

I claim:—

1. In a cradle for logs, means for preventing the lateral escape of the logs from the cradle comprising, on each side of the cradle, a pair of longitudinal logs secured together, and a post between the logs, a cable connecting the lower ends of opposite posts, a cable connecting opposite posts a short distance above said beams, and a cable around the logs of the cradle and between the longitudinal logs on each side of the cradle.

2. In a cradle for logs, means for preventing the lateral escape of the logs from the cradle comprising, on each side of the cradle, a pair of longitudinal logs secured together, and a post between the logs, the logs being mortised to receive said posts, a cable connecting the lower ends of opposite posts, a cable connecting opposite posts a short distance above said beams, and a cable around the logs of the cradle and between the longitudinal logs on each side of the cradle.

3. In a cradle for logs, means for preventing the lateral escape of the logs from the cradle comprising, on each side of the cradle, a longitudinal series of pairs of longitudinal logs secured together, cables connecting the several pairs of the series, and posts between the logs, cables connecting opposite posts above and below said logs, and cables around the logs of the cradle, and passing between the longitudinal logs on each side of the cradle.

4. In a cradle for logs, means for preventing the lateral escape of the logs from the cradle comprising, on each side of the cradle, a longitudinal series of pairs of longitudinal logs secured together, cables connecting the several pairs of the series, and posts between the logs, the logs being mortised to receive said posts, cables connecting opposite posts above and below said logs, and cables around the logs of the cradle, and passing between the longitudinal logs on each side of the cradle.

In testimony whereof I have hereunto set my hand in the presence of two subscribing witnesses.

PATRICK F. DUNDON.

Witnesses:
FRANCIS M. WRIGHT,
D. B. RICHARDS.

Copies of this patent may be obtained for five cents each, by addressing the "Commissioner of Patents, Washington, D. C."